July 3, 1934.  L. E. MOORE  1,964,855
SHAMPOOER
Filed June 27, 1932  2 Sheets-Sheet 1
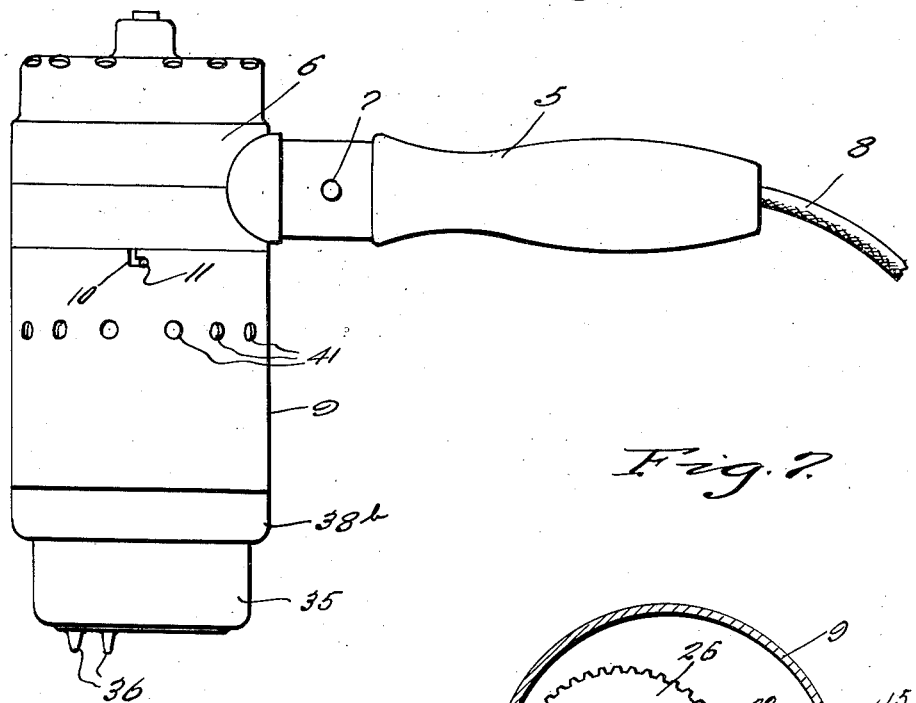
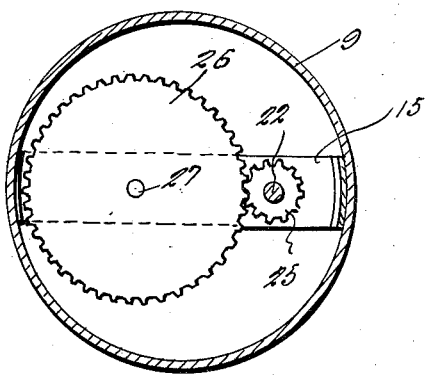
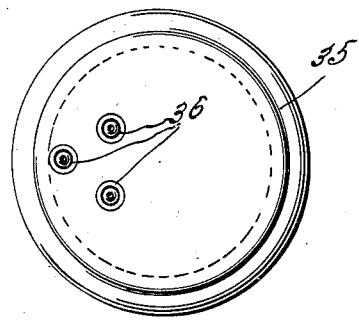
Inventor
Leonard E. Moore
By Clarence A. O'Brien
Attorney July 3, 1934.  L. E. MOORE  1,964,855
SHAMPOOER
Filed June 27, 1932   2 Sheets-Sheet 2
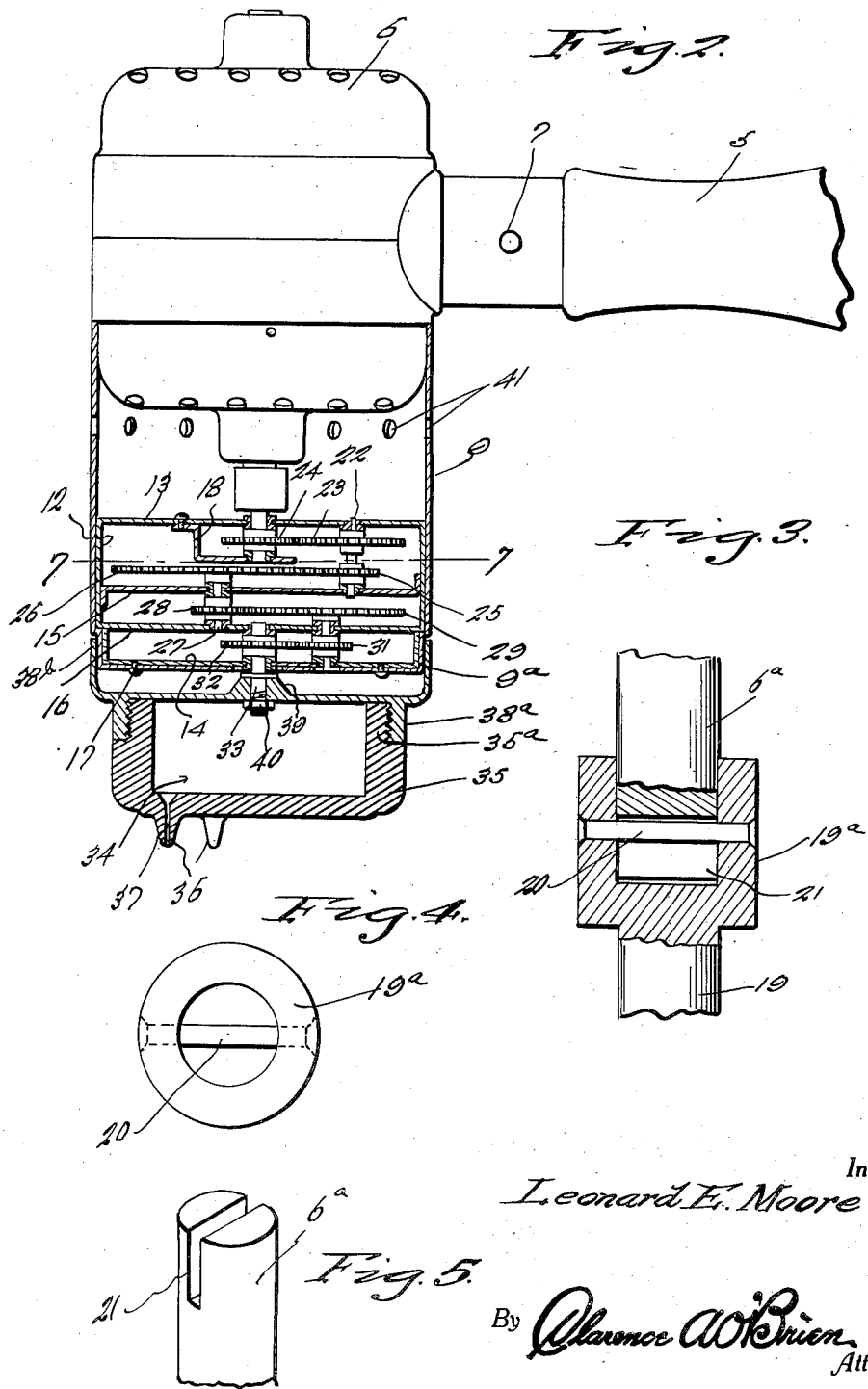
Inventor
Leonard E. Moore
By Clarence A. O'Brien
Attorney Patented July 3, 1934

1,964,855

UNITED STATES PATENT OFFICE 1,964,855

SHAMPOOER

Leonard E. Moore, Durham, N. H.

Application June 27, 1932, Serial No. 619,579

1 Claim. (Cl. 128—56)

This invention is a device for shampooing the head, and in accordance with the present invention a simple and compact structure is provided characterized by a motor driven reservoir from which a shampoo or cleansing liquid is discharged as the device is manipulated to insure a thorough cleansing of the head.

The invention together with its numerous objects and advantages will be best understood from a study of the following description, taken in connection with the accompanying drawings wherein:

Figure 1 is a side elevational view of the device.

Figure 2 is a view partly in section and partly in elevation illustrating certain details of construction to be hereinafter more fully referred to.

Figure 3 is a fragmentary sectional elevational view showing the manner of coupling one of the driven shafts forming part of a gear reduction mechanism with the armature shaft of an electric motor.

Figure 4 is an end elevational view of the motor shaft.

Figure 5 is a fragmentary perspective view of one end of a gear shaft adapted to be coupled with the motor shaft.

Figure 6 is a bottom plan view of a driven reservoir and

Figure 7 is a transverse sectional view taken substantially on the line 7—7 of Figure 2.

Referring in detail to the drawings it will be seen that my improved shampooing device comprises a handle 5 of wood, "bakelite" or any other suitable material that is suitably provided at one end for attachment to an electric motor 6. A suitable switch 7 is mounted on the handle 5 for controlling the motor 6 and the handle 5 is also provided with an opening therethrough for accommodating an end portion of an electric cord 8.

A cylindrical casing 9 is provided and is open at one end, and at its open end is adapted to receive therein one end of the electric motor 6. At its open end the casing 9 is provided with bayonet slots 10 with which cooperate pins 11 provided on diametrically opposite sides of the motor 6 for detachably connecting the casing 9 with the motor.

Arranged in the bottom or lower portion of the casing 9 is a substantially rectangular frame 12 having upper and lower cross bars 13, 14 and intermediate cross bars 15, 16. The lower cross bar 14 is secured to the bottom of the casing 9 by screws or like fastening elements 17.

Suitably carried by the upper frame bar 13 is an angular bracket 18 and this bracket 18 together with the frame member 13 supports a stub shaft 19, which shaft 19 at its upper end is provided with a socket 19a for receiving the free end of the motor shaft 6a. Extending transversely of the socket 19a is a coupling pin 20 which engages a slot 21 in the free end of the motor shaft 6a upon entrance of said end 6a of the motor shaft into the socket 19a as shown in Figure 3.

Frame bars 13, 15 support therebetween a vertical stub shaft 22 and a gear wheel 23 is mounted on the shaft 22 and is in mesh with a gear wheel 24 on shaft 19, gear wheel 23 being of slightly greater diameter than gear wheel 24. A relatively small gear wheel 25 is mounted on the lower portion of shaft 22 and this gear wheel 25 is in mesh with a relatively large gear wheel 26 mounted on the upper end of a shaft 27 that is suitably supported between the frame bars 15, 16. On the shaft 27 between the frame bars 15, 16 is a relatively small gear wheel 28 that is in mesh with a relatively large gear wheel 29 provided on the upper end of a shaft 30 suitably supported between the frame bars 14 and 16. On the shaft 30 between the frame bars 14 and 16 is a relatively small gear wheel 31 that is in mesh with a gear wheel of slightly larger diameter mounted between the frame bars 14, 16 on a shaft 33. Manifestly shaft 33 will be driven from the motor at a greatly reduced speed relative to the speed of the motor shaft 6a through the medium of the reduction gearing just described.

Suitably mounted on the shaft 33 for rotation therewith is what may be termed a fluid chamber 34. Fluid chamber 34 comprises a cup-shaped member 35 made of rubber or other suitable and similar material and provided on its bottom wall with a plurality, in the present instance, three, flexible teats 36 having discharge passages 37 therethrough. For the receptacle 35 there is provided a cover plate 38 that has an internally threaded neck portion 38a screwed onto and externally threaded neck portion 35a provided at the open side of the cup-shaped container 35. The cover plate 38 is also provided with an annular flange 38b which telescopically receives the closed reduced end 9a of the casing 9. At its center portion the cover plate 38 is provided with a hub 39 that is clamped on the free end of the shaft 33 between a fixed collar on said shaft and a nut 40 screw threadedly engaged with said shaft.

In operation the chamber 34 is filled to the desired level with a liquid cleaning agent, in the present instance a liquid suitable for shampoo purposes; and in use the switch 7 is closed for closing the circuit to the motor 6, and through the medium of the reduction gearing power is transmitted from the motor shaft to the chamber 34 for revolving the latter. As the chamber 34 revolves the device is moved over the head, with the teats 36 at intervals move in direct contact with the scalp for massaging the same and causing circulation, and at the same time the contents of the reservoir or chamber 34 discharge through the passages 37 on to the scalp for washing or shampooing the hair.

It will be noted that the teats 36 are arranged somewhat eccentrically and will thus, as the device is moved over the head, describe a rather circuitous course.

From the foregoing it will be seen that I have devised a comparatively simple yet thoroughly practical and efficient device for shampooing the hair and wherein the parts are readily separable for cleaning or replacement purposes. In this connection it will be noted that the casing 9 may be readily detached from the motor 6 by rotating the casing in a clockwise direction in Figure 1 for disengaging the pins 11 from the slots 10 whereupon the casing 9 may be readily removed.

With the casing 9 detached from the motor it will be apparent that the frame 12 may be readily removed therefrom if desired by loosening the fastening elements 17. It is also apparent that the cover plate 38 for the receptacle 35 may be readily removed from the shaft 33 and that the receptacle 35 may be unscrewed from its cover plate without disturbing the position of the cover plate when the latter is secured to the shaft 33.

The casing 9 is also provided with a circular series of ports or apertures 41 to insure sufficient circulation of air.

Even though I have herein shown and described the preferred embodiment of the invention, it is to be understood that the same is susceptible of further changes, modifications and improvements coming within the scope of the appended claim.

Having thus described my invention, what I claim as new is:

In a massaging device, a handle, a motor mounted on one end thereof, a casing open at one end and closed at a relatively opposite end and receiving in the open end thereof one end of said motor, interengaging means on the motor and on said casing for releasably connecting the casing with the motor, a frame removably positioned within said casing, motion transmitting means mounted in said frame and including shafts and gearing connecting said shafts, a quick detachable connection between one of the shafts of the motion transmitting means, and the shaft of said motor, and a massaging element mounted on a second one of the shafts of said motion transmitting means and located exteriorly of the casing at the closed end of the latter.

LEONARD E. MOORE.